(12) United States Patent
Park et al.

(10) Patent No.: US 9,024,484 B2
(45) Date of Patent: May 5, 2015

(54) METHOD AND APPARATUS FOR CONTROLLING WIRELESS POWER OF A RECEIVER IN A WIRELESS POWER TRANSMISSION/RECEPTION SYSTEM

(75) Inventors: Se-Ho Park, Gyeonggi-do (KR); Young-Min Lee, Gyeonggi-do (KR); Kyung-Woo Lee, Seoul (KR); Kang-Ho Byun, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 432 days.

(21) Appl. No.: 13/490,963

(22) Filed: Jun. 7, 2012

(65) Prior Publication Data

US 2012/0313446 A1 Dec. 13, 2012

Related U.S. Application Data

(60) Provisional application No. 61/494,175, filed on Jun. 7, 2011.

(30) Foreign Application Priority Data

Jun. 5, 2012 (KR) .................. 10-2012-0060595

(51) Int. Cl.
*H01F 27/42* (2006.01)
*H02J 5/00* (2006.01)
*H04B 5/00* (2006.01)

(52) U.S. Cl.
CPC .............. *H02J 5/005* (2013.01); *H04B 5/0037* (2013.01)

(58) Field of Classification Search
USPC ........................................ 307/104
See application file for complete search history.

(56) References Cited

U.S. PATENT DOCUMENTS

| 2008/0315826 | A1 | 12/2008 | Alberth, Jr. et al. |
| 2009/0127937 | A1 | 5/2009 | Widmer et al. |
| 2009/0140691 | A1 | 6/2009 | Jung |

FOREIGN PATENT DOCUMENTS

| GB | 2472769 | 2/2011 |
| KR | 1020090056545 | 6/2009 |
| KR | 1020100083846 | 7/2010 |
| KR | 1020100134843 | 12/2010 |
| KR | 101034740 | 5/2011 |

OTHER PUBLICATIONS

European Search Report dated Nov. 26, 2014 issued in counterpart application No. 12797089.5-1806.

*Primary Examiner* — Robert L. Deberadinis
(74) *Attorney, Agent, or Firm* — The Farrell Law Firm, P.C.

(57) ABSTRACT

A method and apparatus are provided for controlling power of a receiver in a wireless power transmission/reception system, wherein a wireless power quantity supplied to receivers from a transmitter is controlled through communication between the receivers. The method includes receiving required power information transmitted from a joining receiver in a charging area of a transmitter; determining whether the transmitter is capable of supplying required power to the joining receiver based on the required power information; and requesting the joining receiver to maintain a standby state, when the transmitter is not capable of supplying the required power to the joining receiver.

14 Claims, 6 Drawing Sheets

METHOD AND APPARATUS FOR CONTROLLING WIRELESS POWER OF A RECEIVER IN A WIRELESS POWER TRANSMISSION/RECEPTION SYSTEM

PRIORITY

This application claims priority under 35 U.S.C. §119 to U.S. Provisional Patent Application Ser. No. 61/494,175, which was filed in the U.S. Patent and Trademark Office on Jun. 7, 2011, and Korean Patent Application Serial No. 10-2012-0060595, which was filed in the Korean Intellectual Property Office on Jun. 5, 2012, the entire disclosure of each of which is hereby incorporated by reference.

BACKGROUND OF THE INVENTION

1. Field of the Invention

The present invention relates generally to a wireless power transmission and reception system, and more particularly, to a method and apparatus for controlling power of a receiver in a wireless power transmission and reception system, wherein a wireless power quantity supplied to receivers from a transmitter is controlled through communication between the receivers.

2. Description of the Related Art

Wireless charging (or non-contact) technology uses wireless power transmission and reception, for example, to charge a battery of an electronic device by placing the electronic device on a charging pad, without having to connect a separate charging connector to the electronic device.

Wireless charging technology may be roughly divided into an electromagnetic induction type using a coil, a resonance type using resonance, and a Radio Frequency (RF)/micro wave radiation type for transforming electrical energy into a microwave.

In the resonance type of the wireless charging technology, a resonance type power transmission principle is used to wirelessly transmit electricity a distance of several meters from a charging device. Basically, resonance type power transmission uses a similar concept of physics in which vibration of a tuning fork causes a wine glass beside the tuning fork to vibrate at the same frequency. However, instead of resonating sound, resonance type power transmission resonates an electromagnetic wave containing electrical energy.

The resonated electrical energy is directly delivered to a device having a same resonance frequency, and the non-used portion of the resonated electrical energy is absorbed again into an electromagnetic field, instead of being spread through the air, such that unlike other electromagnetic waves, the resonated electrical energy does not to have an influence upon a peripheral machine or human body.

When charging using the resonance type of the wireless charging technology, each of a plurality of receivers that wants charging requests transmission of wireless power from a transmitter for transmitting the wireless power. The transmitter then supplies wireless power to each of the receivers. Basically, the receiver requests the transmitter to transmit wireless power, and is supplied with wireless power from the transmitter in response to the request.

Additionally, a single transmitter may charge a plurality of receivers at the same time. Further, when a receiver is being charged, i.e., supplied with wireless power from the transmitter, the transmitter may receive a request to transmit wireless power from another receiver.

However, when a plurality of receivers are supplied with wireless power from a transmitter at the same time, an over-powered state of over-voltage or over-current may occur in the transmitter or the receivers. Thereafter, the transmitter or receivers stop the charging, for example, by short-circuiting a circuit or the like, to protect against over powering. However, when the transmitter or the receivers stop the charging in this way, inconveniently, a user cannot charge the receiver using the transmitter or cannot use the receiver.

SUMMARY OF THE INVENTION

Accordingly, the present invention is designed to address at least the problems and/or disadvantages described above and to provide at least the advantages described below.

An aspect of the present invention is to provide a method and apparatus for controlling power of a receiver in a wireless power transmission and reception system, wherein a wireless power quantity supplied to receivers from a transmitter is controlled through communication between the receivers.

According to an aspect of the present invention, a method is provided for controlling wireless power of a receiver in a wireless power transmission and reception system. The method includes receiving required power information transmitted from a joining receiver in a charging area of a transmitter; determining whether the transmitter is capable of supplying required power to the joining receiver based on the required power information; and requesting the joining receiver to maintain a standby state, when the transmitter is not capable of supplying the required power to the joining receiver.

According to another aspect of the present invention, a method is provided for controlling wireless power of a receiver in a wireless power transmission and reception system. The method includes transmitting, by the receiver, required power information to a transmitter; receiving charging power information from a registered receiver included in the charging area; determining whether the transmitter is capable of supplying required power based on the charging power information; and maintaining a standby state, when the transmitter is not capable of supplying the required power.

According to another aspect of the present invention, a receiver in a wireless power transmission/reception system is provided. The receiver includes a communication interface that receives required power information transmitted from a joining receiver in a charging area to which a transmitter supplies wireless power; and a receiver (Rx) Micro Control Unit (MCU) that determines whether the transmitter is capable of supplying required power to the joining receiver based on the required power information, and that requests the joining receiver to maintain a standby state when the transmitter is not capable of supplying the required power to the joining receiver.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will be described in detail below with reference to the accompanying drawings. In the following description, specific items such as detailed components are described, and it is apparent to those of ordinary skill in the art that those specific items are provided only for overall understanding of the present invention and predetermined changes or modifications can be made without departing from the scope of the present invention.

Figure 1:
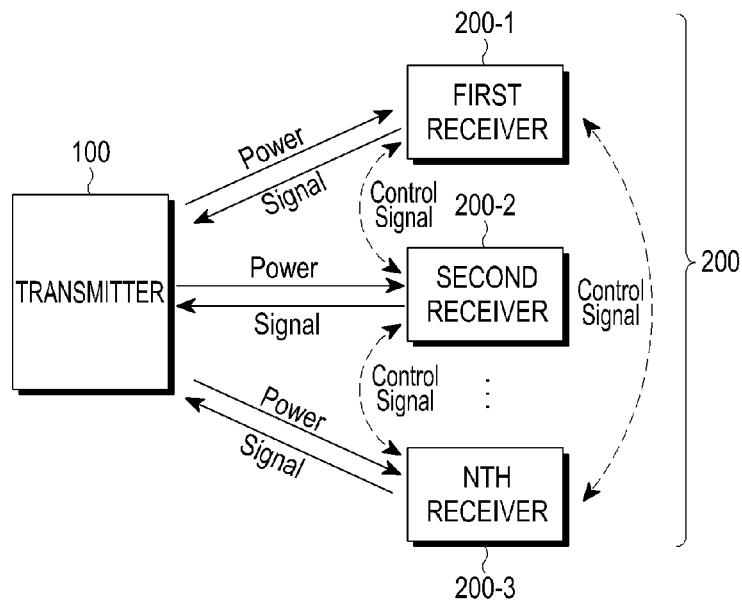
FIG. 1 is a block diagram illustrating a wireless power transmission and reception system according to an embodiment of the present invention.

FIG. 1 is a block diagram illustrating a wireless power transmission and reception system according to an embodiment of the present invention.

Referring to FIG. 1, a wireless power transmission and reception system includes a transmitter 100 and N receivers 200, i.e., a first receiver 200-1 and a second receiver 200-2 through an $N^{th}$ receivers 200-N.

The transmitter 100 transmits wireless power to the receivers 200. The transmitter 100 includes a resonator (hereinafter, a 'Tx resonator'), and transmits wireless power to the receivers 200 by resonating carrier frequencies including electrical energy using the Tx resonator.

The receivers 200 transmit control signals, via communication interfaces, requesting the transmitter 100 to supply wireless power, and receive the wireless power from the transmitter 100. The receivers 200 include resonators (hereinafter, 'Rx resonators') for receiving the wireless power from the transmitter 100.

Additionally, the resonators also generate a signal in a particular frequency band, such that the receivers 200 may request supply of the wireless power from the transmitter 100 by resonating carrier frequencies in a frequency band for supply of the wireless power through the Rx resonators. The transmitter 100 also receives wireless power transmission requests from the receivers 200 through the Tx resonator.

In accordance with an embodiment of the present invention, each of the receivers 200 communicates with each other, when in a range in which the transmitter 100 can transmit wireless power. Herein, an area in which the transmitter 100 can transmit wireless power will be referred to as a "charging area." For example, assuming that the first receiver 200-1 and the second receiver 200-2 are located in the charging area, the first receiver 200-1 and the second receiver 200-2 communicate with each other using their respective wired or wireless communication interfaces.

When a new receiver 200 joins the charging area, the new receiver 200 requests the transmitter 100 to transmit required power thereto. Herein, receivers previously included in the charging area will be referred to as "registered receivers" and a receiver newly joining the charging area will be referred to as a "joining receiver." The registered receivers receive a power transmission request transmitted from the joining receiver to the transmitter 100 and analyze the desired-power transmission request in order to calculate the required power with which the joining receiver desires to be supplied from the transmitter 100. The registered receivers then determine if the transmitter 100 can supply the required power of the joining receiver.

For example, when the transmitter 100 can supply wireless power of 50 W in total to the receivers 200 and the transmitter 100 is already supplying 45 W of wireless power to the registered receivers included in the charging area, when the joining receiver requests 7 W of wireless power from the transmitter 100, the transmitter 100 cannot supply the power to the joining receiver because the remaining power of the transmitter 100 is only 5 W. In accordance with an embodiment of the present invention, the transmitter 100 supplies only wireless power at the request of the receivers 200, such that the registered receivers, in place of the transmitter 100, may inform the joining receiver that the required power of 7 W cannot be supplied by the transmitter 100.

In accordance with another embodiment of the present invention, the joining receiver may calculate the remaining power of the transmitter 100. The joining receiver receives control signals from the registered receivers in the charging area, for example, charging power information, and determines whether the transmitter 100 can transmit the required power to the joining receiver based on the charging power information.

In accordance with an embodiment of the present invention, the charging power information broadcast from the registered receivers includes a wireless power quantity supplied to the respective registered receivers, and a total wireless power quantity that the transmitter 100 can supply. Therefore, based on the charging power information, the joining receiver calculates the remaining power of the transmitter 100 and determines whether the calculated remaining power is larger than the power desired by the joining receiver. If the remaining power of the transmitter 100 is smaller than the power desired by the joining receiver, the transmitter 100 cannot supply the desired power to the joining receiver. Therefore, the joining receiver requests the transmitter 100 to transmit the desired power only when the remaining power of the transmitter 100 is larger than the desired power of the joining receiver.

In accordance with another embodiment of the present invention, the receivers 200 included in the charging area broadcast the charging power information at preset broadcasting intervals. For example, when the first receiver 200-1 is being supplied with 5 W of wireless power from the transmitter 100, the first receiver 200-1, the second receiver 200-2, and a third receiver 200-3 are included in the charging area, and a broadcasting interval of the first receiver 200-1 is 5 minutes, the first receiver 200-1 broadcasts a signal to the charging area indicating that it is supplied with 5 W of wireless power from the transmitter 100 every 5 minutes.

Figure 2:
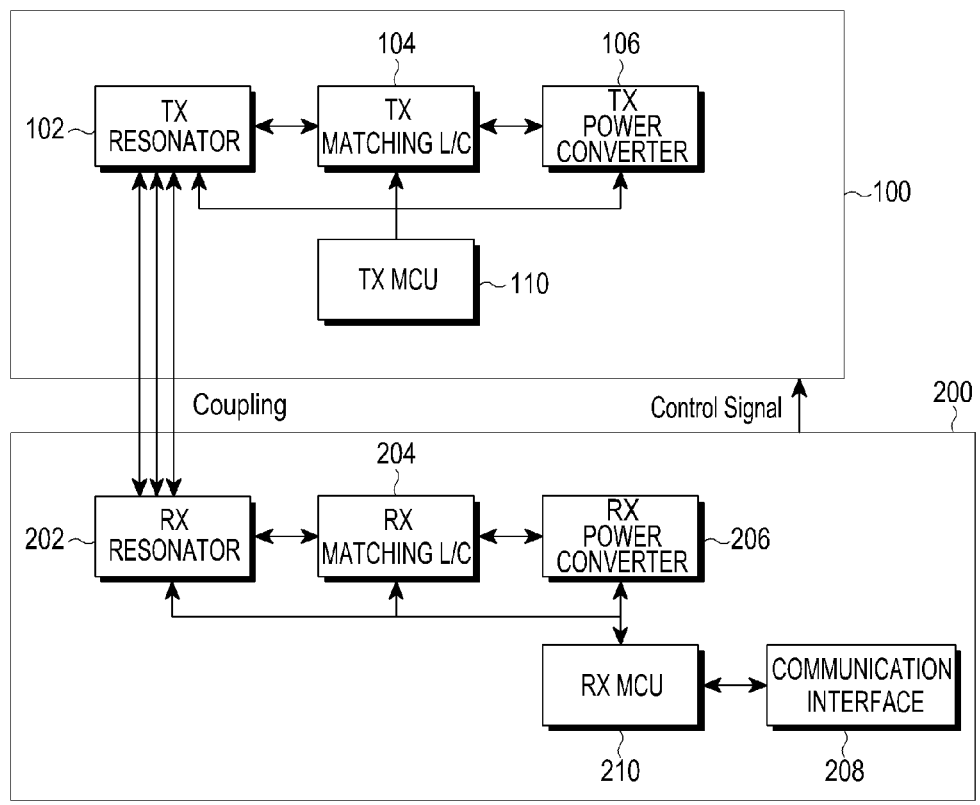
FIG. 2 is a block diagram illustrating a transmitter and a receiver in a wireless power transmission and reception system according to an embodiment of the present invention.

FIG. 2 is a block diagram illustrating structures of a transmitter and a receiver in the wireless power transmission and reception system according to an embodiment of the present invention.

Referring to FIG. 2, the transmitter 100 includes a Tx resonator 102, a Tx matching inductance (L)/capacitance (C)

circuit), a Tx power converter 106, and a Tx Micro Control Unit (MCU) 110. The Tx resonator 102 is coupled with an Rx resonator 202 of the receiver 200 to resonate an Alternating Current (AC) voltage into a resonance wave, thereby supplying wireless power to the receiver 200. Additionally, the Tx resonator 102 receives various control signals, e.g., the charging power information, the requested power information, etc., transmitted from the receiver 200.

The Tx matching L/C 104 includes an impedance that is matched for the Tx resonator 102 and the Rx resonator 202 to be coupled and the Rx resonator 202 to smoothly receive the resonance wave resonated from the Tx resonator 102. The Tx matching L/C 104 controls the impedance under control of the Tx MCU 110.

The Tx power converter 106 converts a Direct Current (DC) voltage input from a DC adaptor (not shown) connected with the transmitter 100 into an AC voltage. For voltage conversion, the Tx power converter 106 includes, for example, a Class-E amplifier (not shown) and a driver amplifier (not shown). The Driver Amp converts a DC voltage input from the DC adaptor into an AC voltage. The Class-E Amp amplifies the AC voltage amplified by the Driver Amp under control of the Tx MCU 110.

The transmitter 100 receives, for example, a DC voltage of 7-15V from a DC adaptor (not shown). Upon input of the DC voltage, the Tx MCU 110 controls the Tx power converter 106 to convert the DC voltage into an AC voltage and to amplify the converted AC voltage. The Tx MCU 110 regulates an amplification rate of the AC voltage in the Tx power converter 106. The amplified AC voltage is delivered to the Rx resonator 202 of the receiver 200 by the Tx resonator 102.

The Tx MCU 110 controls overall operation of the transmitter 100. Specifically, the Tx MCU 110 controls the transmitter 100 to receive the DC voltage from the DC adaptor, and controls the Tx power converter 106 to regulate the power of the amplified AC voltage. Once the charging of the receiver 200 is completed, the transmitter 100 may be controlled not to transmit power to the receiver 200 anymore. The Tx MCU 110 regulates the impedance of the Tx matching L/C 104 to facilitate power transmission of the transmitter 100. The Tx MCU 110 compares the power transmitted from the transmitter 100 with the power delivered to the receiver 200 to calculate a power efficiency. Based on the calculated power efficiency, the Tx MCU 110 regulates the impedance of the Tx matching L/C 104 in order to maximize the power efficiency.

The receiver 200 includes the Rx resonator 202, an Rx matching L/C 204, an Rx power converter 206, a communication interface 208, and an Rx MCU 210. The Rx resonator 202 is coupled with the Tx resonator 102 to receive a resonated resonance wave from the Tx resonator 102, thus being supplied with wireless power from the transmitter 100.

The Rx matching L/C 204 regulates an impedance to be matched for the Tx resonator 102 and the Rx resonator 202 to be coupled and a resonated resonance wave to be smoothly received from the Tx resonator 102. A total impedance of the Tx matching L/C 104 and a total impedance of the Rx matching L/C 204 are preferably matched to have the same value.

The Rx power converter 206 converts the AC voltage received through the Rx resonator 202 into the DC voltage. For voltage conversion, the Rx power converter 206 includes, for example, an AC/DC rectifier (not shown) and a DC/DC converter (not shown). The AC/DC rectifier converts the AC voltage received through the Rx resonator 202 into the DC voltage, and the DC/DC converter amplifies the DC voltage converted through the AC/DC rectifier. The Rx power converter 206 delivers the DC voltage output through the DC/DC converter to a device connected with the receiver 200, e.g., a portable terminal, such that the portable terminal can be driven by the DC voltage.

The communication interface 208 performs wired or wireless communication of the receiver 200. The communication interface 208 transmits a control signal requesting power supply or stopping of the power supply from the transmitter 100 to the transmitter 100. The communication interface 208 broadcasts the control signal to the charging area.

The communication interface 208 also communicates with another receiver in the charging area, and receives a control signal broadcast from the another receiver. For example, the control signal includes a wireless power request signal for requesting wireless power from the transmitter 100, a status signal indicating the current status of the receiver 200, etc.

The Rx MCU 210 controls the overall operation of the receiver 200. The Rx MCU 210 controls the receiver 200 to deliver a DC voltage for driving a portable terminal connected with the receiver 200.

The Rx MCU 210 controls the Rx power converter 206 to regulate an amplification rate of an amplified DC voltage. The Rx MCU 210 also regulates the impedance of the Rx matching L/C 204 to smoothly receive wireless power delivered through the Tx resonator 102 of the transmitter 100.

The Rx MCU 210 generates a control signal broadcast through the communication interface 208 to the transmitter 100 and registered receivers included in the charging area or a joining receiver. The Rx MCU 210 controls the communication interface 208 to receive control signals broadcast from the registered receives included in the charging area or the joining receiver. The Rx MCU 210 identifies a wireless power quantity (charging power) supplied to the respective registered receives included in the charging area or a wireless power quantity (required power) requested by the joining receiver from the control signals. The Rx MCU 210 calculates a total wireless power quantity of the wireless power supplied to the respective registered receivers, and calculates a remaining power quantity of the transmitter 100 using the total wireless power quantity. The Rx MCU 210 also determines whether the remaining power quantity is larger than the required power quantity of the joining receiver. If the remaining power quantity is smaller than the required power quantity of the joining receiver, then the Rx MCU 210 controls the communication interface 208 to generate a standby request control signal and to transmit the generated standby request control signal to the joining receiver.

If the receiver 200 is a joining receiver, the Rx MCU 210 determines whether the remaining power quantity is larger than a desired power quantity. If the remaining power quantity is smaller than the desired power quantity, the joining receiver maintains a standby state without requesting the transmitter 100 to supply the desired power. The Rx MCU 210 generates a control signal indicating maintenance of the standby state and broadcasts the control signal to the transmitter 100 and the registered receivers included in the charging area through the communication interface 208.

Figure 3:
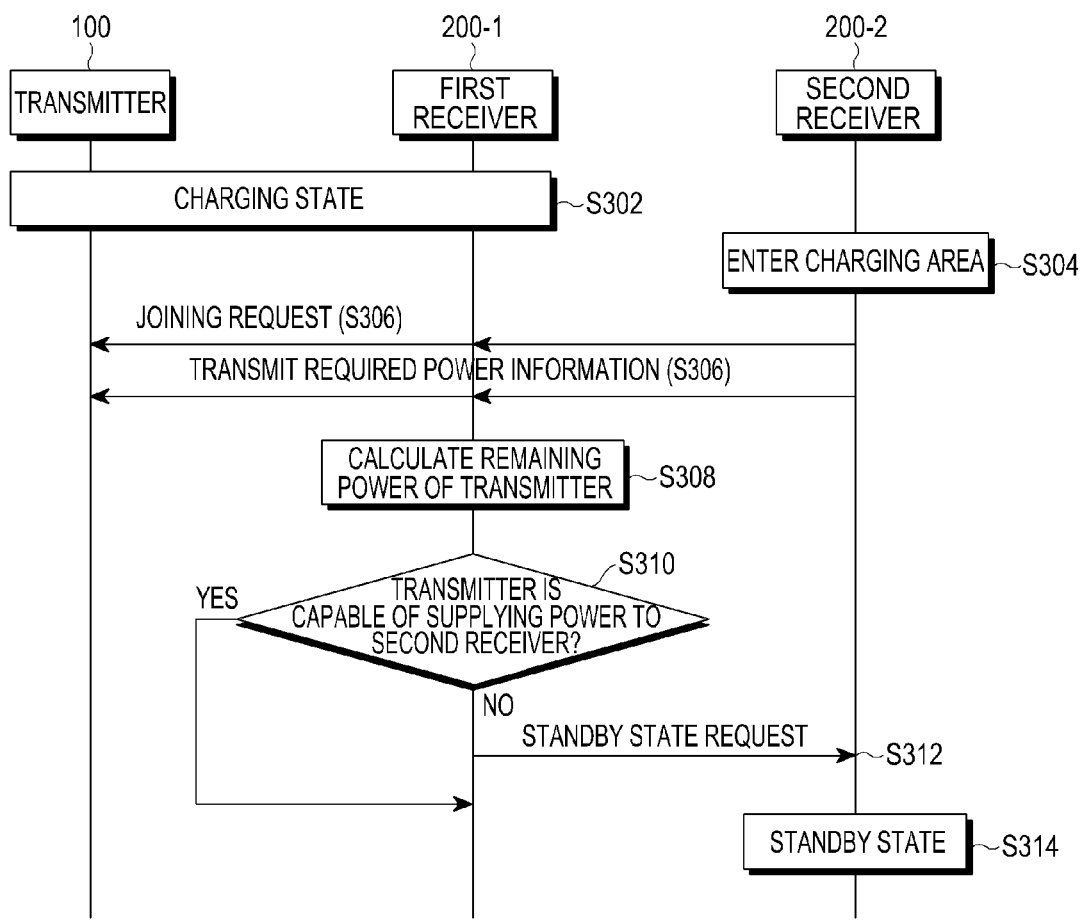
FIG. 3 is a signal flow diagram illustrating a method for controlling power of receivers in a wireless power transmission and reception system according to an embodiment of the present invention.

FIG. 3 is a signal flow diagram illustrating a method for controlling power of receivers in a wireless power transmission and reception system according to an embodiment of the present invention.

Referring to FIG. 3, in step S302, i.e., a charging state, the first receiver 200-1 receives wireless power from the transmitter 100.

In step S304, the second receiver 200-2, which is a joining receiver, enters the charging area.

In step S306, the second receiver 200-2 requests joining from the transmitter 100. Specifically, the Rx MCU 210 of the second receiver 200-2 generates a joining request control signal for requesting joining from the transmitter 100, and transmits the joining request control signal to the transmitter 100 through the communication interface 208.

In step S306, the second receiver 200-2 transmits a control signal including required power information to the transmitter 100. Specifically, the second receiver 200-1 transmits the required power information to the transmitter 100 by broadcasting the control signal including the required power information to the charging area. The required power information indicates a wireless power quantity the joining receiver, i.e., the second receiver 200-2, requires from the transmitter 100. The first receiver 200-1 receives the control signal broadcast by the second receiver 200-2. As described above, the first receiver 200-1 receives the control signals transmitted to the transmitter 100 in order to acquire the required power information of the second receiver 200-2.

In step S308, the first receiver 200-1 calculates a remaining power of the transmitter 100. The first receiver 200-1, together with respective registered receivers included in the charging area, knows a total wireless power quantity that is being supplied or is to be supplied from the transmitter 100. The first receiver 200-1 also knows the total wireless power quantity that can be output from the transmitter 100. Using this information, the first receiver 200-1 calculates the remaining power of the transmitter 100.

In step S310, the first receiver 200-1 determines whether the transmitter 100 can supply the required power to the second receiver 200-2, based on the remaining power of the transmitter 100.

If the transmitter 100 can supply the required power to the second receiver 200-2 (YES in step S310), the first receiver 200-1 does not perform any subsequent operation. However, if the transmitter 100 cannot supply the required power to the second receiver 200-2 (NO in step S310), the first receiver 200-1 requests the second receiver 200-2 to maintain a standby state in step S312. Specifically, the Rx MCU 210 of the first receiver 200-1 generates a standby state request signal and transmits the standby state request signal to the second receiver 200-2 through the communication interface 208.

In step S314, the second receiver 200-2 maintains the standby state.

In accordance with an embodiment of the present invention, the first receiver 200-1 determines in step S310 that the transmitter 100 cannot supply the required power to the second receiver 200-2 if the remaining power of the transmitter 100, after transmitting the required power the second receiver 200-2 would be smaller than a preset reference value, although the total remaining power, prior to transmitting the required power the second receiver 200-2, is larger than the power the second receiver 200-2 requires from the transmitter 100. For example, when the required power of the second receiver 200-2 is 7 W, the remaining power of the transmitter 100 is 9 W, and the reference value is 3 W, the first receiver 200-1 determines that the remaining power of the transmitter 100, i.e., 2 W, would be smaller than the reference value, i.e., 3 W, when the transmitter 100 supplies wireless power to the second receiver 200-2. Therefore, in this case, the first receiver 200-1 determines that the transmitter 100 cannot supply the required power to the second receiver 200-2.

As described above, a registered receiver instructs a joining receiver to maintain a standby state in order to prevent a circuit included in the transmitter 100 or the receiver 200 from being damaged by over loading even when the remaining power of the transmitter 100 is larger than the required power of the joining receiver.

Figure 4:
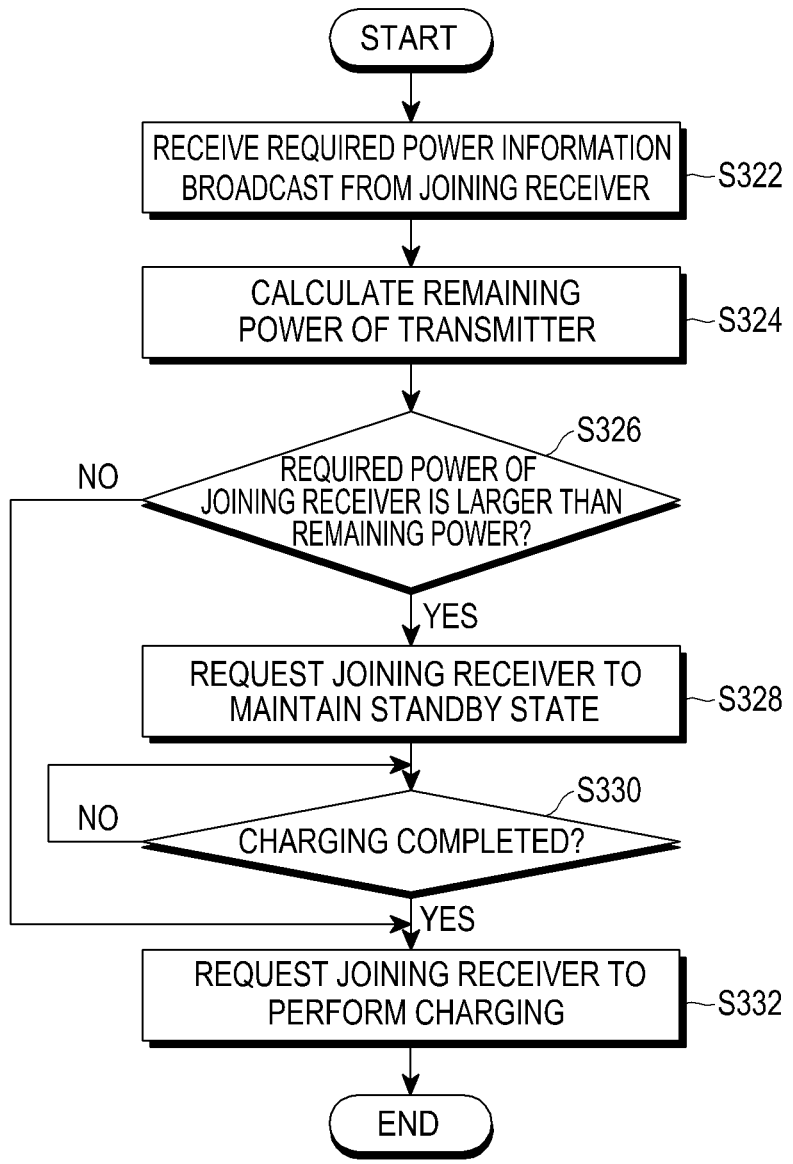
FIG. 4 is a flowchart illustrating a method for controlling power of a receiver in a wireless power transmission and reception system according to an embodiment of the present invention.

FIG. 4 is a flowchart illustrating a method for controlling power of a joining receiver by a registered receiver in a wireless power transmission and reception system according to an embodiment of the present invention.

Referring to FIG. 4, in step S322, the receiver 200, i.e., the registered receiver, receives required power information broadcast from the joining receiver through the communication interface 208. For example, the receiver 200 receives a control signal including the required power information.

In step S324, the receiver 200 calculates the remaining power of the transmitter 100. In step S326, the receiver 200 determines whether the required power of the joining receiver is larger than the remaining power of the transmitter 100.

If the required power of the joining receiver is larger than the remaining power of the transmitter 100 (YES in step S326), the receiver 200 requests the joining receiver to maintain the standby state in step S328. Specifically, the Rx MCU 210 of the receiver 200 generates a standby state request signal and transmits the standby state request signal to the joining receiver through the communication interface 208.

In step S330, the receiver 200 checks, e.g., at predetermined intervals, if its charging has been completed. When the charging has been completed (YES in step S330), the receiver 200 requests the joining receiver to perform charging in step S332. The receiver 200 that has been completely charged maintains the standby state or leaves the charging area.

If the required power of the joining receiver is smaller than the remaining power of the transmitter 100 (NO in step S326), the receiver 200 requests the joining receiver to perform charging in step S332. Alternatively, if the required power of the joining receiver is smaller than the remaining power of the transmitter 100 (NO in step S326), the receiver 200 may take not further action.

Figure 5:
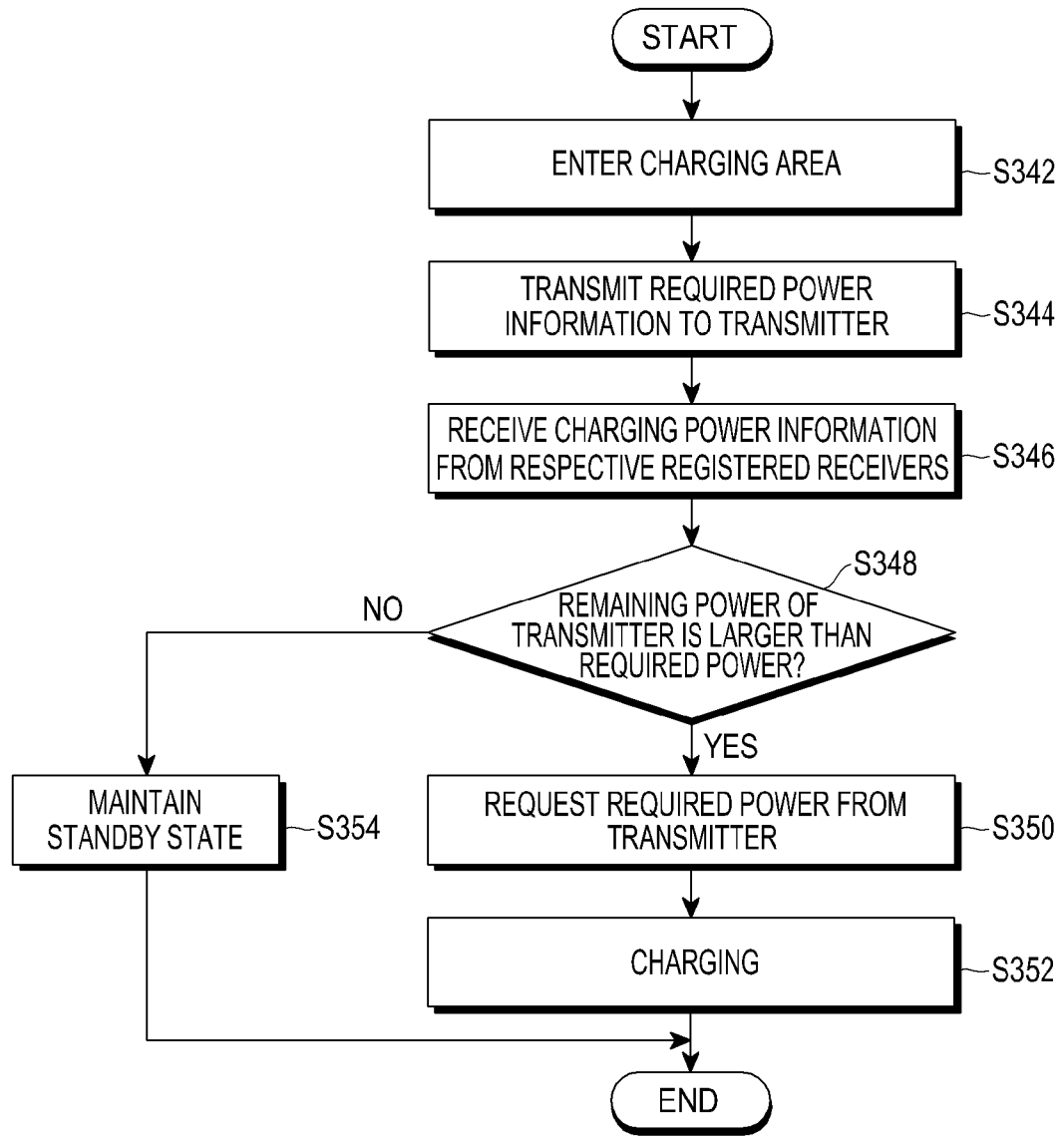
FIG. 5 is a flowchart illustrating a method for controlling power of a receiver in a wireless power transmission and reception system according to an embodiment of the present invention.

FIG. 5 is a flowchart illustrating a method for controlling power of a joining receiver, by the joining receiver, in a wireless power transmission and reception system according to an embodiment of the present invention.

Referring to FIG. 5, the receiver 200, i.e., the joining receiver, enters the charging area in step S342.

In step S344, the receiver 200 transmits required power information to the transmitter 100 through the communication interface 208. Specifically, the receiver 200 generates a control signal including the required power information and transmits the control signal to the transmitter 100.

In step S346, the receiver 200 receives charging power information from respective registered receives included in the charging area through the communication interface 208. Alternatively, steps S344 and S346 may be performed at the same time, or the order of these steps may be interchanged.

As described above, the charging power information includes a wireless power quantity with which the registered receiver is being supplied from the transmitter 100, and further includes a total wireless power quantity the transmitter 100 can supply to the receiver 200.

The receiver 200 calculates the remaining power of the transmitter 100 based on the charging power information and determines whether the remaining power of the transmitter 100 is larger than a required power in step S348.

If the remaining power of the transmitter 100 is larger than the required power (YES in step S348), the receiver 200 requests the transmitter 100 to supply the required power in step S350. In step S352, the receiver 200 performs a charging operation by receiving the wireless power from the transmitter 100.

However, if the remaining power of the transmitter 100 is smaller than the required power in step S348, the receiver 200 maintains the standby state in step S354.

Figure 6A:
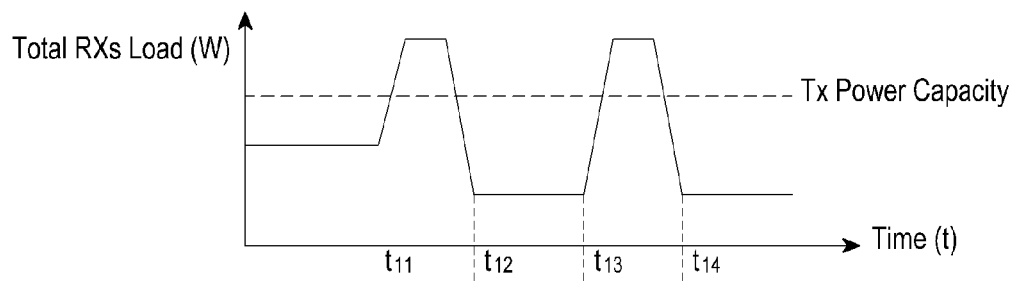
FIGS. 6A and 6B are graphs showing a wireless power quantity transmitted to a receiver in a wireless power transmission and reception system according to prior art.
Figure 6B:
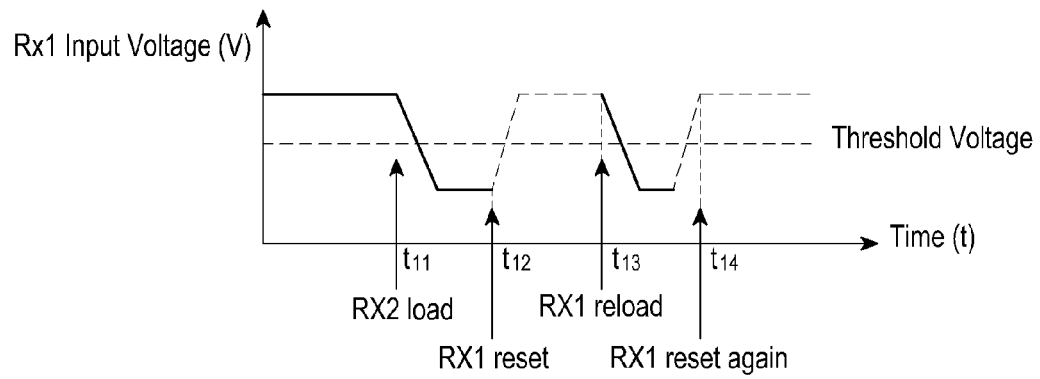

FIGS. 6A and 6B are graphs showing a wireless power quantity transmitted to a receiver in a wireless power transmission and reception system according to prior art. Specifically, FIG. 6A shows a total load (Total RXs Load (W)) applied to receivers (RXs), and FIG. 6B shows a wireless power quantity, i.e., an input voltage (RX1 Input Voltage (V)) with which the first receiver RX1 200-1 among the registered receivers is supplied from the transmitter 100.

Referring to FIGS. 6A and 6B, when the first receiver RX1 200-1 is supplied with the input voltage from the transmitter 100 and the second receiver RX2 200-2 enters the charging area at time $t_{11}$ to be supplied with wireless power from the transmitter 100, a load (RX2 load) is applied. As the second receiver RX2 enters the charging area, a load in the charging area changes. Because the wireless power is supplied to the second receiver RX2, a total load (Total RXs Load) applied to the receivers 200 sharply increases from the time $t_{11}$, and exceeds a total power capacity (TX Power Capacity), which can be supplied from the transmitter 100 to the receivers 200.

Further, the input voltage of the first receiver RX1 sharply decreases, such that the input voltage supplied to the first receiver RX1 may drop below a threshold voltage. In FIG. 6B, the input voltage supplied to the first receiver RX1 sharply drops below the threshold voltage from the time $t_{11}$. The first receiver RX1 is reset at time $t_{12}$ (RX1 reset) to request the transmitter 100 to transmit the input voltage, a load change by the first receiver RX1 occurs at $t_{13}$, and the first receiver RX1 is supplied with the input voltage larger than the threshold voltage from the transmitter 100. However, due to the second receiver RX2 200-2, a total wireless power quantity supplied to the receivers 200 sharply increases from the time $t_{13}$ at which the first receiver RX1 is supplied with the input voltage, such that the total wireless power quantity exceeds the total power capacity of the transmitter 100. Thus, the first receiver RX1 is turned off again and reset again at time $t_{14}$ (RX1 reset again).

Figure 7A:
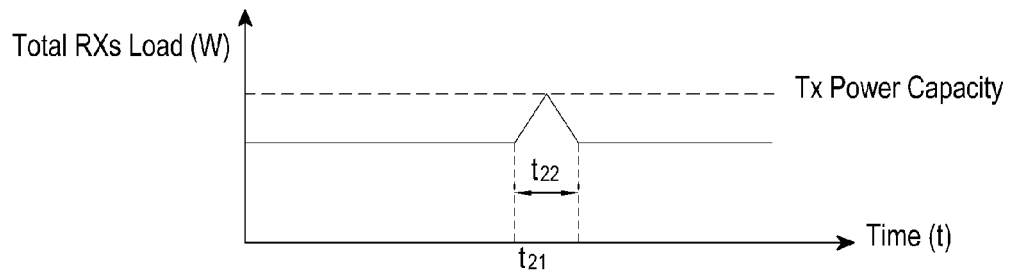
FIGS. 7A and 7B are graphs showing a wireless power quantity transmitted to a receiver in a wireless power transmission and reception system according to an embodiment of the present invention.
Figure 7B:
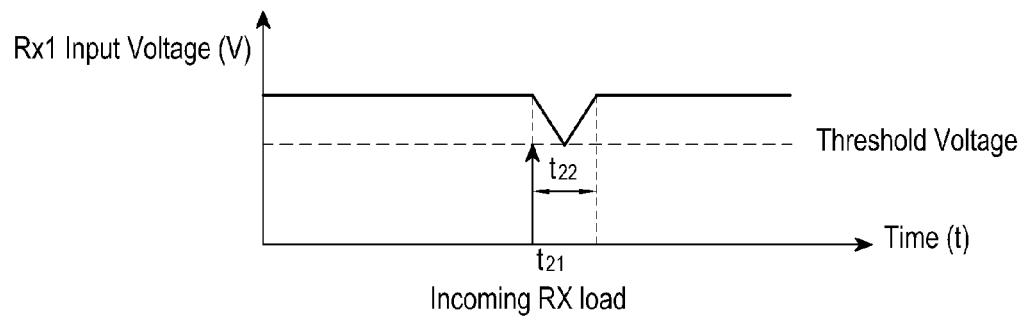

FIGS. 7A and 7B are graphs showing a wireless power quantity transmitted to a receiver in the wireless power transmission and reception system according to an embodiment of the present invention. Specifically, FIG. 7A is a graph showing a total load (Total RXs Load (W)) applied to the receivers 200 RXs, and FIG. 7B is a graph showing a wireless power quantity, that is, an input voltage (RX1 Input Voltage (V)) with which the first receiver RX1 200-1 among the registered receivers is supplied from the transmitter 100.

Referring to FIGS. 7A and 7B, when the first receiver RX1 200-1 is supplied with the input voltage from the transmitter 100 and the second receiver RX2 200-2 enters the charging area at time $t_{21}$ to be supplied with the wireless power from the transmitter 100 (RX2 load), the transmitter 100 senses a load change generated in the charging area, and receives required power information transmitted from the second receiver RX2. The first receiver RX1 is temporarily turned off based on the required power information to reduce the input voltage supplied from the transmitter 100 to the threshold voltage. If the input voltage supplied to the first receiver RX1 during $t_{22}$ is reduced to the threshold voltage or less, the total load amount (Total RXs Load) supplied to the receivers 200 does not exceed the total power capacity (Tx Power Capacity) of the transmitter 100.

Figure 8A:
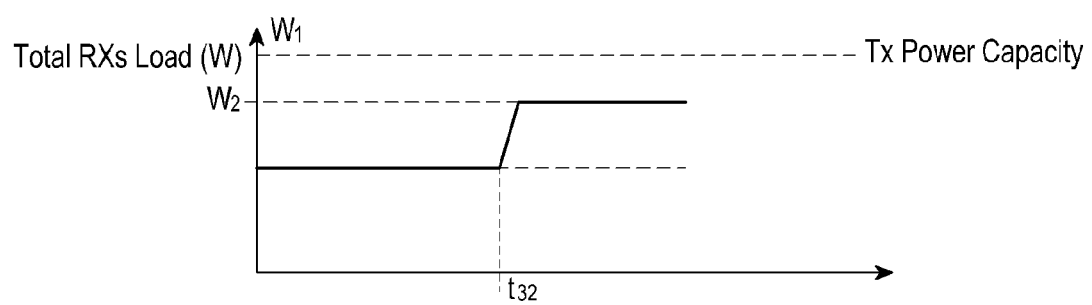
FIGS. 8A and 8B are graphs showing a wireless power quantity transmitted to a receiver in a wireless power transmission and reception system according to an embodiment of the present invention.
Figure 8B:
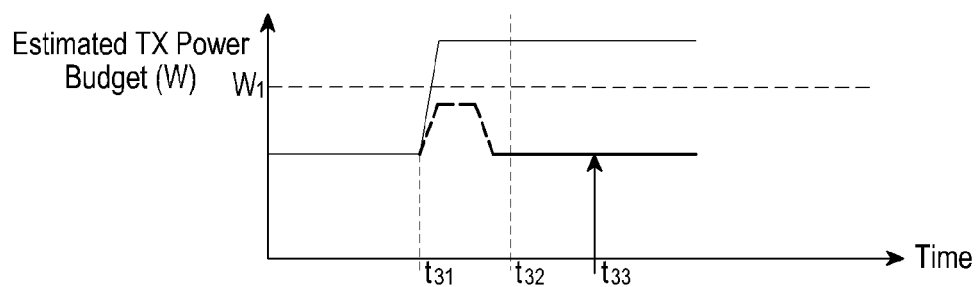

FIGS. 8A and 8B are graphs showing a wireless power quantity transmitted to a receiver in a wireless power transmission and reception system according to an embodiment of the present invention. Specifically, FIG. 8A is a graph showing a total load (Total RXs Load (W)) applied to the receivers RXs, and FIG. 8B is a graph showing an estimated wireless power quantity (Estimated TX Power Budget (W)) supplied to the receivers 200 by the transmitter TX 100.

Referring to FIGS. 8A and 8B, at time $t_{31}$, a load is applied to a client device including the receivers 200. Thus at time $t_{32}$, the receiver RX may be turned on to transmit required power information of the client device to the transmitter 100. In FIGS. 8A and 8B, it is assumed that a threshold value for a total wireless power quantity that can be supplied to the receivers 200 by the transmitter 100 is W1 and a required power quantity of the client device is W2.

The transmitter 100 estimates a total wireless power quantity based on the required power information of the client device.

Referring to FIGS. 8A and 8B, when a load is applied to both the client device and the receivers 200, then an estimated wireless power quantity supplied to the client device and the receivers 200 exceeds the threshold value W1. Thus, the receiver RX maintains the standby state at time $t_{33}$ and only the client device may be supplied with wireless power from the transmitter 100.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for controlling wireless power of a receiver in a wireless power transmission and reception system, the method comprising:
   receiving required power information transmitted from a joining receiver in a charging area of a transmitter;
   determining whether the transmitter is capable of supplying required power to the joining receiver based on the required power information; and
   requesting the joining receiver to maintain a standby state, when the transmitter is not capable of supplying the required power to the joining receiver.

2. The method of claim 1, further comprising receiving charging power information from a registered receiver included in the charging area.

3. The method of claim 2, wherein determining whether the transmitter is capable of supplying the required power to the joining receiver comprises:
   calculating remaining power of the transmitter based on the charging power information; and
   determining whether the remaining power is larger than the required power.

4. The method of claim 3, further comprising determining that the transmitter is capable of supplying the required power to the joining receiver, when the remaining power is larger than the required power.

5. The method of claim 3, further comprising determining that the transmitter is not capable of supplying the required power to the joining receiver, when the remaining power is not larger than the required power.

6. A method of controlling wireless power of a receiver in a wireless power transmission and reception system, the method comprising:
   transmitting, by the receiver, required power information to a transmitter;
   receiving charging power information from a registered receiver included in the charging area;
   determining whether the transmitter is capable of supplying required power based on the charging power information; and maintaining a standby state, when the transmitter is not capable of supplying the required power.

7. The method of claim 6, wherein the charging power information is broadcast from the registered receiver.

8. The method of claim 7, wherein determining whether the transmitter is capable of supplying the required power comprises:
   calculating remaining power of the transmitter based on the charging power information; and
   determining whether the remaining power is larger than the required power.

9. The method of claim 8, further comprising determining that the transmitter is capable of supplying the required power, when the remaining power is larger than the required power.

10. The method of claim 8, further comprising determining that the transmitter is not capable of supplying the required power, when the remaining power is not larger than the required power.

11. A receiver in a wireless power transmission and reception system, the receiver comprising:
   a communication interface that receives required power information transmitted from a joining receiver in a charging area to which a transmitter supplies wireless power; and
   a receiver (Rx) Micro Control Unit (MCU) that determines whether the transmitter is capable of supplying required power to the joining receiver based on the required power information, and that requests the joining receiver to maintain a standby state when the transmitter is not capable of supplying the required power to the joining receiver.

12. The receiver of claim 11, wherein the Rx MCU controls the communication interface to receive charging power information from a registered receiver included in the charging area.

13. The receiver of claim 12, wherein the Rx MCU calculates remaining power of the transmitter based on the charging power information, determines whether the remaining power is larger than the required power, and determines that the transmitter is capable of supplying the required power to the joining receiver when the remaining power is larger than the required power.

14. The receiver of claim 13, wherein the Rx MCU determines that the transmitter is not capable of supplying the required power to the joining receiver when the remaining power is not larger than the required power.

* * * * *